G. W. GOSS.
PLANTING MACHINE.
APPLICATION FILED OCT. 28, 1915.

1,227,610.

Patented May 29, 1917.

Witnesses
R. M. McCormick
A. L. Phelps

Inventor
George W. Goss

By
C. D. Shepherd, Attorney

UNITED STATES PATENT OFFICE.

GEORGE W. GOSS, OF BALTIMORE, OHIO, ASSIGNOR OF ONE-HALF TO CHARLES E. GOSS, OF BALTIMORE, OHIO.

PLANTING-MACHINE.

1,227,610.  Specification of Letters Patent. Patented May 29, 1917.

Application filed October 28, 1915. Serial No. 58,482.

*To all whom it may concern:*

Be it known that I, GEORGE W. GOSS, a citizen of the United States, residing at Baltimore, in the county of Fairfield and State of Ohio, have invented certain new and useful Improvements in Planting-Machines, of which the following is a specification.

My invention relates to planting machines and aims to provide a new and useful type of seed covering device to be used in connection with these planters.

It is common to employ a series of links forming a chain as means for covering a furrow after the seed has been placed in position, these chains being preferably attached directly to the seed planter itself. Various objections arise from the use of these chains, in that it is extremely inconvenient if not entirely impossible to back a planter employing them or to turn sharp corners, one or two of the chains in this latter case usually finding their way beneath the supporting wheels of the planter itself.

My invention aims to overcome these and other objections by the provision of a set of rigid covering elements which are themselves in turn pivoted to the planter structure and are so arranged and constructed that they are limited in their free movement toward the ground, to in this manner prevent them from dragging when the disk mechanism is elevated to its normal inoperative position. In other words, my arrangement is such that the covering device may drag in the usual manner to perform its usual function when the planter is in its position in the ground, but after the planter has been elevated to its inoperative position, as when transporting it from place to place, these covering elements are also elevated to a height sufficient to prevent their dragging.

A further object of my invention resides in a construction whereby these covering elements are provided with an open rear portion or an opening at the end which drags over the ground to cover the furrow. This opening is provided to prevent the collection of weeds, etc., in the normal passage of the machine over a field, the opening being provided to permit the escape of these weeds, etc.

Figure 2:
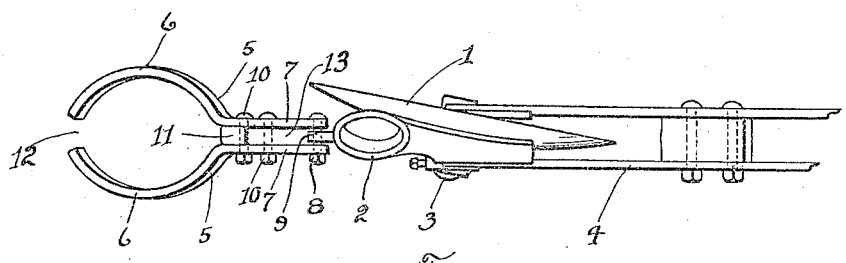
Figure 1:
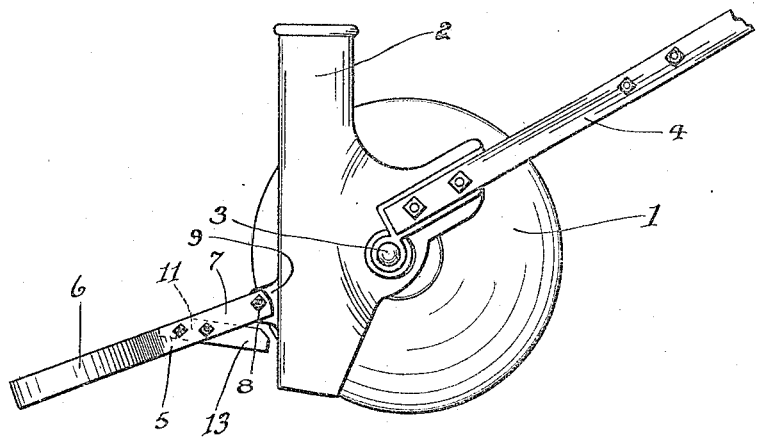

The preferred embodiment of my invention is shown in the accompanying sheet of drawings, in which similar characters of reference designate corresponding parts, and in which:

Figure 1 is a view in side elevation of a single unit of a disk planter showing my invention applied thereto, and, Fig. 2 is a top plan view of the structure shown in Fig. 1.

As will be evident from an inspection of the drawings, I have attempted to illustrate only one of the disk units, the disk itself being represented by the reference numeral 1 and the boot into which the drill enters and through which the seed passes after the disk has cut its furrow, is designated by the reference numeral 2. In the present showing, the disk 1 is of the concaved type and is journaled in an extension of the boot upon the stub shaft as shown at 3. A supporting framework for attaching the disk and its boot to the running gear of the planter as a whole, is designated in its entirety by the reference numeral 4, this construction being common.

My coverer itself comprises a pair of strap members 5 having portions 6 bent to assume a semi-oval shape, while the remaining portions 7 are left straight and the ends pierced to permit the passage of a bolt 8 by means of which the coverer as a whole, is pivotally attached to the planter through the medium of the lip 9 on the boot. These straps are rigidly connected by means of bolts 10 and the spacer 11, this spacer being of such width as to permit a slight play laterally of the coverer as a whole, about its pivot 8. The rear portions of these straps present an opening 12 when they are assembled, it being the purpose of this opening to give an outlet to all weeds, etc., which may collect beneath the coverer as it is directed over the soil. Thus, the furrow is completely covered after the seed has been placed in it by passage through the boot 2 and all weeds, etc., are prevented from collecting in the coverer by means of the opening 12. However, to prevent the coverer from dragging when the planter has been elevated to assume its normal inoperative position, I have provided a finger 13 which in reality is shown in the present case as forming the spacer 11 in Fig. 2. This finger projects forwardly a distance sufficient to cause its engagement with the rear side of the boot 2 when the disk is elevated to assume a position above the ground, or when the planter as a whole is elevated to assume its normal position of inoperativeness.

From the foregoing description, it will be apparent that I have provided a type of covering device of considerable utility, in that weeds and the like are not collected to be dragged over the entire field and further in that the covering device itself may be elevated to assume a position above the ground when the planter is being transported from place to place, or when it is desired to back the planter. Because of the pivotal arrangement shown, these coverers will not move to a position to get beneath the planter supporting wheels in turning a corner and also they are so arranged to permit an operator to walk directly in the rear of the machine without stepping on them. While I have described and shown the covering device in connection with one disk only, it is to be understood that the same arrangement is carried out when these disks are mounted side by side as, in fact, all planters on the market at the present time do.

What I claim, is:

1. In combination with a seed planter and its boot, of a seed coverer comprising a pair of strap elements bolted together, means for pivotally supporting said coverer from said boot, and a spacer block between said straps through which the bolt passes which holds said straps together, said spacer also projecting toward said boot to limit the down movement of said coverer when said boot is elevated by contact therewith.

2. The combination with a seed planter and its boot, of a seed coverer comprising a pair of strap elements bolted together, means for pivotally bolting said coverer to said boot so that the coverer will be permitted a perceptible lateral movement, and a spacer block between said straps through which the bolt passes which holds said straps together, said spacer also projecting toward said boot to limit the down movement of the coverer when said boot is elevated by contact therewith.

3. In combination with a disk seed planter and its boot, a seed coverer comprising a pair of semi-oval shaped strap elements pivoted to said boot in a manner to permit them lateral movement, said straps being shaped to leave an open space at the rear when assembled, and a finger carried by said straps so arranged to engage said boot to prevent the downward movement of said straps to prevent their dragging when the disk mechanism is elevated to its normal inoperative position.

In testimony whereof I affix my signature in presence of two witnesses.

GEORGE W. GOSS.

Witnesses:
 E. K. MORROW,
 C. H. EMSWILER.

Copies of this patent may be obtained for five cents each, by addressing the "Commissioner of Patents, Washington, D. C."